US012682292B1

(12) United States Patent

Girouard

(10) Patent No.: US 12,682,292 B1

(45) Date of Patent: Jul. 14, 2026

(54) APPARATUS AND METHOD FOR GENERATING A FRAMEWORK

(71) Applicant: Capital Asset Management Group, Inc., Washington, DC (US)

(72) Inventor: John Edward Girouard, Washington, DC (US)

(73) Assignee: Capital Asset Management Group, Inc., Washington, DC (US)

( * ) Notice: Subject to any disclaimer, the term of this patent is extended or adjusted under 35 U.S.C. 154(b) by 0 days.

(21) Appl. No.: 19/282,975

(22) Filed: Jul. 28, 2025

(51) Int. Cl.
*G06N 20/20* (2019.01)

(52) U.S. Cl.
CPC ..................................... *G06N 20/20* (2019.01)

(58) Field of Classification Search
CPC ....................................................... G06N 20/00
See application file for complete search history.

(56) References Cited

U.S. PATENT DOCUMENTS

| | | | | |
|---|---|---|---|---|
| 12,086,721 | B1 * | 9/2024 | Smith ........................ | G06N 3/09 |
| 2018/0068274 | A1 * | 3/2018 | Buffington ............. | G06Q 40/06 |
| 2021/0141517 | A1 * | 5/2021 | Camargo .............. | H04L 67/535 |

| | | | |
|---|---|---|---|
| 2022/0028001 | A1 | 1/2022 | Wachell et al. |
| 2022/0129988 | A1 | 4/2022 | Faucher-Courchesne et al. |
| 2023/0102491 | A1 | 3/2023 | Crawford et al. |

FOREIGN PATENT DOCUMENTS

| | | |
|---|---|---|
| IN | 202411015282 A | 3/2024 |
| IN | 202421067529 A | 10/2024 |

OTHER PUBLICATIONS

Goyal, Yashika, Hari Mohan Rai, and Aditya Pal. "Optimizing Financial Planning Through Advanced Machine Learning Techniques." Optimization Tools and Techniques for Enhanced Computational Efficiency. IGI Global Scientific Publishing, 2025. 169-204. (Year : 2025).*

\* cited by examiner

*Primary Examiner* — Kevin W Figueroa

(74) *Attorney, Agent, or Firm* — CALDWELL LLC

(57) ABSTRACT

An apparatus and method for generating a framework are disclosed. The apparatus includes at least a processor and a memory communicatively connected to the at least a processor, wherein the memory contains instructions configuring the at least a processor to receive a data set, extract a plurality of key data points and a plurality of targets from the data set as a function of one or more data categories, generate a framework including a plurality of framework parameters as a function of the plurality of key data points and the plurality of targets using a framework machine-learning module, and generate a dynamic user interface including the framework.

20 Claims, 7 Drawing Sheets

600

605 Receiving a Data Set

610 Extracting a Plurality of Key Data Points

615 Generating a Framework

620 Generating a Dynamic User Interface

APPARATUS AND METHOD FOR GENERATING A FRAMEWORK

FIELD OF THE INVENTION

The present invention generally relates to the field of data framework. In particular, the present invention is directed to an apparatus and method for generating a framework.

BACKGROUND

Recent advancements in machine learning and data processing have enabled the development of intelligent systems capable of analyzing large and complex datasets. However, existing solutions often fail to integrate user input dynamically or adjust frameworks in real time based on evolving data.

SUMMARY OF THE DISCLOSURE

In an aspect, an apparatus for generating a framework is disclosed. The apparatus includes at least a processor and a memory communicatively connected to the at least a processor, wherein the memory contains instructions configuring the at least a processor to receive a data set associated with a user from data sources, wherein receiving the data set includes receiving the data set from an interactive data structure, wherein the interactive data structure is configured to be updated as a function of a user input, extract a plurality of key data points and a plurality of targets from the data set as a function of one or more data categories, generate a framework including a plurality of framework parameters as a function of the plurality of key data points and the plurality of targets using a framework machine-learning module, wherein generating the framework includes determining an allocation datum for each of the plurality of targets using an allocation machine-learning model of the framework machine-learning module and updating the plurality of framework parameters as a function of the allocation datum and generate a dynamic user interface including the framework.

In another aspect, a method for generating a framework is disclosed. The method includes receiving, using at least a processor, a data set associated with a user from data sources, wherein receiving the data set includes receiving the data set from an interactive data structure, wherein the interactive data structure is configured to be updated as a function of a user input, extracting, using the at least a processor, a plurality of key data points and a plurality of targets from the data set as a function of one or more data categories, generating, using the at least a processor, a framework including a plurality of framework parameters as a function of the plurality of key data points and the plurality of targets using a framework machine-learning module, wherein generating the framework includes determining an allocation datum for each of the plurality of targets using an allocation machine-learning model of the framework machine-learning module and updating the plurality of framework parameters as a function of the allocation datum and generating, using the at least a processor, a dynamic user interface comprising the framework.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating a framework. The apparatus includes at least a processor and a memory communicatively connected to the at least a processor, wherein the memory contains instructions configuring the at least a processor to receive a data set associated with a user from data sources, wherein receiving the data set includes receiving the data set from an interactive data structure, wherein the interactive data structure is configured to be updated as a function of a user input, extract a plurality of key data points and a plurality of targets from the data set as a function of one or more data categories, generate a framework including a plurality of framework parameters as a function of the plurality of key data points and the plurality of targets using a framework machine-learning module, wherein generating the framework includes determining an allocation datum for each of the plurality of targets using an allocation machine-learning model of the framework machine-learning module and updating the plurality of framework parameters as a function of the allocation datum and generate a dynamic user interface including the framework. Exemplary embodiments illustrating aspects of the present disclosure are described below in the context of several specific examples.

Figure 1:
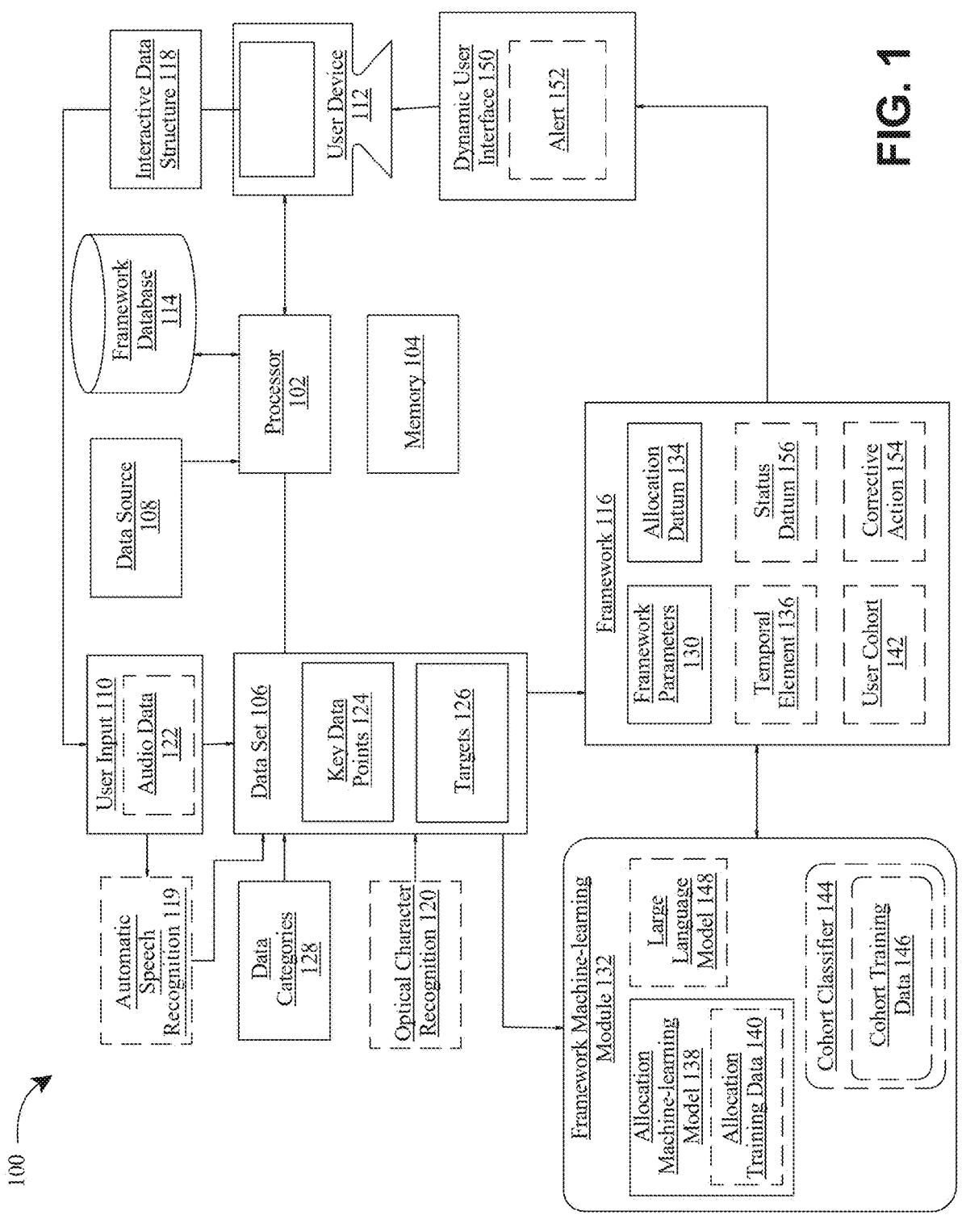
FIG. 1 illustrates a block diagram of an exemplary apparatus for generating a framework.

Referring now to FIG. 1, an exemplary embodiment of an apparatus 100 for generating a framework is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 contains instructions configuring processor 102 to receive a data set 106 associated with a user from data sources 108. For the purposes of this disclosure, a "data set" is a set of information or variables associated with a user. For the purposes of this disclosure, a "user" is an entity or organization that uses an apparatus 100. In some embodiments, data set 106 may include numerical data, textual data, images, user input 110, or other forms of structured or unstructured information. As a non-limiting example, data set 106 may include financial data, user preferences, user demographics, and the like. For example, and without limitation, data set 106 may include bank account balances, assets, liabilities, net worth, income, expenditure patterns, savings goals, investments, credit scores, loan details, and the like. For example, and without limitation, data set 106 may include name, gender, date of birth, residency, religion, organ donation, occupation, family, contact information, emergency contact, and the like. For example, and without limitation, data set 106 may include a job title, level of education, or the like. In some embodiments, data set 106 may include document, report, questionnaire, and the like. In some embodiments, data set 106 may include behavior data. For the purposes of this disclosure, "behavior data" is data that indicates a user's actions. In some embodiments, behavior data may include user's actions, decisions, and interactions related to managing money: for instance, without limitation, to spending, saving, investing, budgeting, debt repayment, or the like. As a non-limiting example, behavior data may include records of financial transactions, user interactions with financial tools or applications, engagement with financial recommendations or alerts, timing of bill payments, frequency of overdraft occurrences, preferred payment methods, or the like.

With continued reference to FIG. 1, for the purposes of this disclosure, a "data source" is an entity, system, or mechanism from which a data set can be derived. As a non-limiting example, data source 108 may include databases, application programming interfaces (APIs), internet of thing (IoT) devices, user device 112, and the like. In some embodiments, processor 102 may receive data set 106 from a framework database 114. In some embodiments, apparatus 100 may include a framework database 114. As used in this disclosure, "framework database" is a data structure configured to store data associated with a framework. In one or more embodiments, framework database 114 may include inputted or calculated information and datum related to framework 116. The framework 116 described further in detail below. In some embodiments, a datum history may be stored in framework database 114. As a non-limiting example, the datum history may include real-time and/or previous inputted data related to framework 116. As a non-limiting example, framework database 114 may include instructions from a user, who may be an expert user, a past user in embodiments disclosed herein, or the like, where the instructions may include examples of the data related to framework 116.

With continued reference to FIG. 1, in some embodiments, processor 102 may be communicatively connected with framework database 114. For example, and without limitation, in some cases, framework database 114 may be local to processor 102. In another example, and without limitation, framework database 114 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store framework database 114. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, framework database 114 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 102 may receive data set 106 from a user device 112. For the purposes of this disclosure, a "user device" is any device a user use to input data. As a non-limiting example, user device 112 may include a laptop, desktop, tablet, mobile phone, smart phone, smart watch, kiosk, screen, smart headset, or things of the like. In some embodiments, user device 112 may include an interface configured to receive inputs from user. In some embodiments, user may manually input any data into apparatus 100 using user device 112. In some embodiments, user may have a capability to process, store or transmit any information independently.

With continued reference to FIG. 1, in some embodiments, processor 102 may receive data set 106 from an application programming interface (API). As used herein, an "application programming interface" is a set of functions that allow applications to access data and interact with external software components, operating systems, or microdevices, such as another web application or computing device. As a non-limiting example, an API may provide access to user financial data stored in third-party banking systems, such as account balances, recent transactions, or investment portfolio summaries. As a non-limiting example, an API may query an internal database to retrieve user profiles or financial records. In some embodiments, processor 102 may receive updated data or real-time data set 106 from an API. In some embodiments, data set 106 may include updated data. As a non-limiting example, processor 102 may receive how well a fund is actually performing. As another non-limiting example, updated data may include any real-time data related to a user. As another non-limiting example, updated data may include real-time fund valuation, historical performance trends, dividend distributions, interest rate changes, economic indicators, or the like.

With continued reference to FIG. 1, in some embodiments, data set 106 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 102 may generate web crawler to scrape data set 106 from user's website. The web crawler may be seeded and/or trained with a reputable website to begin the search. Web crawler may be generated by processor 102. In some embodiments, web crawler may be trained with information received from user through a user interface. In some embodiments, web crawler may be configured to generate a web query. A web query may include search criteria received from user. For example, user may submit a plurality of websites for web crawler to search to data set 106. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 102, received from a machine learning model, and/or received from user. In some embodiments, a relevancy score may include a range of numerical values that may correspond to a relevancy strength of data received from a web crawler function. As a non-limiting example, a web crawler function may search the Internet for data set 106 related to user.

With continued reference to FIG. 1, receiving data set 106 includes receiving the data set 106 from an interactive data structure 118. For the purposes of this disclosure, an "interactive data structure" is a data representation or interface element that allows user interaction to input, modify, or manipulate a data set. As a non-limiting example, interactive data structure 118 may include a questionnaire, which prompts a user to provide information (data set 106) through predefined fields. In a non-limiting example, processor 102 may receive data set 106 through interactive data structure 118 from a user device 112. For example, and without limitation, interactive data structure 118 may be displayed on a user device 112 through a user interface and user may manipulate the user interface or interactive data structure 118 to input data set 106. For instance, and without limitation, an interactive data structure 118 may include a form displayed within a mobile application or web browser, wherein a user can input data set 106 by typing into designated fields or selecting options from provided menus. For example, and without limitation, interactive data structure 118 may include a dynamic slider interface, wherein a user can adjust a slider to set a numerical value (e.g., a savings goal, monthly budget, or desired investment amount). For example, and without limitation, interactive data structure 118 may include charts or graphs that allow users to drag, drop, or rearrange data points to update their input. In some embodiments, interactive data structure 118 may include a speech recognition interface (automatic speech recognition 119 described below) for users to verbally dictate data set 106 (audio data 122).

With continued reference to FIG. 1, interactive data structure 118 is configured to be updated as a function of a user input 110. For the purposes of this disclosure, a "user input" is a is an action or communication initiated by a user to provide, modify, or adjust information. As a non-limiting example, user input 110 may include typing, selecting, or dragging interface elements, and the like. As another non-limiting example, user input 110 may include audio data 122, gestures, and the like. In some embodiments, receiving data set 106 may include receiving audio data 122 of user input 110 from a user and extracting data set 106 from the audio data 122 using an automatic speech recognition 119. For the purposes of this disclosure, "audio data" is sound-based information. For example, and without limitation, audio data 122 may include a user stating, "I want to buy a house in the future." In a non-limiting example, if a user input 110 is related to an "retirement fund," processor 102 may update interactive data structure 118 to prompt a user with specific follow-up questions or actions related to "retirement fund."

With continued reference to FIG. 1, memory 104 contains instructions configuring processor 102 to extract a plurality of key data points 124 and a plurality of targets 126 as a function of one or more data categories 128. For the purposes of this disclosure, a "key data point" is a piece of information derived from a data set. As a non-limiting example, key data point 124 may include numerical metrics: for instance, a user's annual income, monthly expenses, current savings balance, or outstanding debt amounts. In another non-limiting example, key data point 124 may include categorical information: for instance, user's risk tolerance (e.g., "low," "moderate," or "high"), financial priorities (e.g., "paying off debt" or "saving for retirement"), goal timelines (e.g., "short-term" or "long-term"), and/or the like. In some embodiments, key data point 124 may be stored in framework database 114 and processor 102 may retrieve key data point 124 from the framework database 114. In some embodiments, user may manually input key data point 124.

With continued reference to FIG. 1, for the purposes of this disclosure, a "target" is an objective associated with a user. In some embodiments, targets 126 may include specific outcomes, thresholds, or benchmarks within a scope of a user's financial or other objectives. As a non-limiting example, target 126 may include financial goals for saving $50,000 for a home down payment within five years. As another non-limiting example, target 126 may include generating $2,000 in monthly retirement income. As another non-limiting example, target 126 may include reducing debt by 20% over a specific time frame. As another non-limiting example, target 126 may include lifestyle-oriented goals. For example, and without limitation, target 126 may include saving for a vacation. For example, and without limitation, target 126 may include funding educational expenses. As another non-limiting example, target 126 may include achieving a specific return on investment (ROI) or maintaining an expense-to-income ratio below a certain percentage. In some embodiments, target 126 may be stored in framework database 114 and processor 102 may retrieve target 126 from the framework database 114. In some embodiments, user may manually input target 126.

With continued reference to FIG. 1, for the purposes of this disclosure, a "data category" is a classification or grouping of associated data. As a non-limiting example, data categories 128 may include income, expenses, savings, investments, and the like. For instance, and without limitation, an "income" data category may include information or key data points 124 related to salary, bonuses, freelance earnings, or other revenue sources. For instance, and without limitation, an "expenses" data category may include rent, utilities, insurance premiums, and discretionary spending. In some embodiments, data categories 128 may be stored in framework database 114 and processor 102 may retrieve data categories 128 from the framework database 114. In some embodiments, user may manually input data categories 128.

With continued reference to FIG. 1, in some embodiments, at least a processor 102 may analyze data set 106 to extract key data points 124 and/or target 126 using optical character recognition (OCR) 120. For the purposes of this disclosure, "optical character recognition" is a technology that enables the recognition and conversion of printed or written text into machine-encoded text. In some cases, the at least a processor 102 may be configured to recognize a keyword using the OCR 120 to find key data points 124. As used in this disclosure, a "keyword" is an element of word or syntax used to identify and/or match elements to each other. In some cases, the at least a processor 102 may transcribe much or even substantially all data set 106.

With continued reference to FIG. 1, in some embodiments, optical character recognition 120 or optical character reader may include automatic conversion of images of written (e.g., typed, handwritten or printed text) text into machine-encoded text. In some cases, recognition of a keyword from data set 106 may include one or more processes, including without limitation optical character recognition (OCR) 120, optical word recognition, intelligent character recognition, intelligent word recognition, and the like. In some cases, OCR 120 may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR 120 may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of data set 106. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the data set 106 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR 120. In some embodiments, machine-learning processes like nearest neighbor classifiers (e.g., k-nearest neighbors algorithm) may be used to compare image features with stored glyph features and choose a nearest match. OCR 120 may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR 120 may employ a two-pass approach to character recognition. A first pass may try to recognize a character. Each character that is satisfactory may be passed to an adaptive classifier as training data. The adaptive classifier then may get a chance to recognize characters more accurately as it further analyzes data set 106. Since the adaptive classifier may have learned something useful a little too late to recognize characters on the first pass, a second pass may be run over the data set 106. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR 120 may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some cases, processor 102 may include audiovisual speech recognition (AVSR) processes to data set 106 and/or key data points 124.

For example, processor 102 may use data set 106 and/or a video record of a user speaking to aid in recognition of data set 106 and/or key data points 124 such as viewing user move their lips to speak on video to process data set 106 and/or key data points 124. AVSR may use images to aid the overall translation of data set 106 and/or key data points 124. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize data set 106 and/or key data points 124. For instance, audio vector and image vector may each be concatenated and used to predict speech made by a user, who is 'on camera.'

With continued reference to FIG. 1, in some embodiments, processor 102 may obtain data set 106 and/or key data points 124 using automatic speech recognition (ASR) 119. As a non-limiting example, ASR 119 may analyze a record of a user talking about their financial goal or anything onto a microphone on a user device 112 to obtain data set 106. For the purposes of this disclosure, "automatic speech recognition" is a technology that converts spoken language into written text or machine-readable form. In some embodiments, ASR 119 may include techniques employing language processing to aid speech recognition processes. In some cases, ASR may be used to decode (i.e., recognize) indeterministic phonemes or help in forming a preponderance among probabilistic candidates. In some cases, ASR 119 may include an audio-based automatic speech recognition process and an image-based automatic speech recognition process. ASR 119 may analysis audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network. In some cases, ASR 119 employs an audio datum to recognize data set 106 and/or key data points 124. For instance, audio vector may each be concatenated and used to predict speech made by a user.

Still referring to FIG. 1, in some embodiments, automatic speech recognition 119 may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 102. Processor 102 may then train an automatic speech recognition model according to training data which includes data sets and/or key data points. In this way, processor 102 may analyze a person's specific voice and train an automatic speech recognition model to the person's speech, resulting in increased accuracy. Alternatively or additionally, in some cases, processor 102 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 102 may first recognize a speaker of a video or data set 106 and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include a user. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition 119 may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments, HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., data set 106 and/or key data points 124). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., data set 106 and/or key data points 124) speeds. In some cases, DTW may allow processor 102 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 3-5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify data set 106 and/or key data points 124 over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, memory 104 contains instructions configuring processor 102 to generate a framework 116 including a plurality of framework parameters 130 as a function of a plurality of key data point 124 and a plurality of targets 126 using a framework machine-learning module 132. For the purposes of this disclosure, a "framework" is an organized structure or plan. In some embodiments, framework 116 may guide a user toward achieving targets 126 based on key data points 124. In some embodiments, framework 116 may be customized to a user's individual circumstances and dynamically updated as new data (data set 106) becomes available or targets 126 are modified. In a non-limiting example, framework 116 may serve as a roadmap or actionable plan for a user. As a non-limiting example, framework 116 may include a structured plan that supports key life goals (targets 126. In a non-limiting example, framework 116 may include a plurality of financial goals (framework parameter 130) corresponding to different targets 126, along with required capital (allocation datum 134) for each goal. For instance, and without limitation, a framework 116 for retirement planning may include projected savings milestones, target retirement income, and an investment strategy tailored to the user's risk tolerance and timeline. In some embodiments, framework 116 may include non-financial objectives. As a non-limiting example, framework may include health, education, or career-related goals. For example, and without limitation, framework 116 for career advancement may include obtaining certifications, networking milestones, or transitioning to a new role within a specified timeframe as framework parameters 130.

With continued reference to FIG. 1, for the purposes of this disclosure, a "framework parameter" is a component, metric, or goal within a framework that defines or contributes to achieving targets. In some embodiments, framework parameters 130 may include quantitative or qualitative and may represent actionable steps, intermediate objectives, or performance benchmarks. As a non-limiting example, framework parameter 130 may include a plurality of steps or goals that a user must complete to achieve targets 126. For instance, in a retirement planning framework, framework parameters 130 may include specific contributions to savings accounts (e.g., monthly deposits of $500), projected savings milestones (e.g., $100,000 saved by age 40), and asset allocation strategies (e.g., 70% stocks, 30% bonds). In another non-limiting example, framework parameter 130 may include non-financial steps, such as enrolling in a professional development course to support career goals, scheduling health screenings to achieve wellness objectives, or allocating time for skill development in preparation for a new role. In some embodiments, framework parameters 130 may include dependencies or relationships between goals. For instance, and without limitation, a user's progress toward a "buy a home" target 126 may depend on achieving an intermediate parameter, such as reducing debt to qualify for a favorable mortgage rate.

With continued reference to FIG. 1, in some embodiments, generating framework 116 may include determining a temporal element 136 for each of a plurality of targets 126 and allocation datum 134. For the purposes of this disclosure, a "temporal element" is a data element related to time. As a non-limiting example, temporal element 136 may include a timeline for achieving a target 126. As a non-limiting example, temporal element 136 may include a timeline for framework parameters 130. For instance, and without limitation, temporal element 136 may specify that a user must achieve a savings milestone of $10,000 within 12 months as part of a framework 116. In another non-limiting example, temporal element 136 may include a deadline for completing a specific target 126. For instance, and without limitation, a temporal element 136 for a vacation savings goal may set a deadline of six months, after which the target 126 is expected to be achieved. In some embodiments, temporal element 136 may include recurring intervals or schedules. For example, and without limitation, temporal element 136 may define that monthly contributions of $500 are required for a target 126 over a period of five years.

With continued reference to FIG. 1, for the purposes of this disclosure, a "framework machine-learning module" is a machine-learning module that generates a framework. In some embodiments, framework machine-learning module 132 may generate a framework 116 by analyzing key data points 124 and targets 126, identifying relationships or dependencies between them, and creating a structured plan (framework 116) optimized for achieving the user's goals. As a non-limiting example, framework machine-learning module 132 may utilize algorithms to predict optimal paths, allocate resources, or recommend specific actions: for instance, without limitation, regression models, clustering techniques, neural networks, reinforcement learning, or the like. For example, and without limitation, framework machine-learning module 132 may include a plurality of machine-learning models: for instance, and without limitation, an allocation machine-learning model 138 or any machine-learning models described in this disclosure. In a non-limiting example, framework machine-learning module 132 may analyze a user's income, expenses, and risk tolerance (key data points 124) in relation to their goal of saving for retirement (target 126) and framework machine-learning module 132 may generate framework 116 outlining a plurality of framework parameters 130 and allocation datum 134. In some embodiments, framework machine-learning module 132 may incorporate user feedback to refine framework 116 dynamically. For instance, and without limitation, if a user adjusts a financial goal (user feedback), framework machine-learning module 132 may update associated framework parameters 130 and reallocate resources (allocation datum 134) or recommend changes to achieve the revised target 126.

With continued reference to FIG. 1, in some embodiments, framework machine-learning module 132 may be configured for managing multiple target funds that ensures each fund is adequately funded based on projected goals and required returns. In some embodiments, framework machine-learning module 132 may be configured for separate target fund management (framework parameter 130) for each life goal (target 126). In some embodiments, framework machine-learning module 132 may be configured to provide projections of the amount of capital required for each fund to meet its goal, factoring in desired returns and timelines. In some embodiments, framework machine-learning module 132 may be configured for an automated fund reallocation function, wherein processor 102 can provide recommendations if some criteria are met. For example, and without limitation, if one fund is underperforming, framework machine-learning module 132 may suggest reallocating resources from other funds to meet the target. In some embodiments, framework machine-learning module 132 may be configured to track performance for each fund, showing real-time changes in value, and whether it is on track to meet the target. In some embodiments, framework machine-learning module 132 may be incorporate goal adjustment and optimization engine. In some embodiments, processor 102 may analyze a user's financial data (data set 106 and/or key data points 124) and goals (targets 126) and suggests personalized adjustments to optimize the likelihood of achieving financial independence. In some embodiments, processor 102 may propose actions to adjust contributions, change asset allocations, and/or modify timelines based on ongoing performance. In some embodiments, processor 102 may utilize AI-driven analysis of financial data to recommend optimizations for goal achievement, predictive modeling that forecasts how adjustments to goals or financial decisions will impact the user's overall financial independence timeline, behavioral insights from the AI system that may identify potential challenges to goal achievement, and real-time personalized recommendations that update as a user's financial situation changes.

With continued reference to FIG. 1, generating framework 116 include determining an allocation datum 134 for each of a plurality of targets 126 using an allocation machine-learning model 138 of the framework machine-learning module 132 and updating a plurality of framework parameters 130 as a function of the allocation datum 134. For the purposes of this disclosure, an "allocation datum" is a data element that indicates an allocation of resource. As a non-limiting example, allocation datum 134 may indicate a proportion of resources to be allocated across multiple targets 126 or framework parameters 130. For example, and without limitation, if a user's financial framework includes both a retirement fund and a vacation savings fund, allocation datum 134 may specify that 80% of discretionary income be allocated to the retirement fund while 20% is allocated to the vacation fund. In some embodiments, allocation datum 134 may include time-based resource allocation. For instance, and without limitation, allocation datum 134 may specify that a user devote three hours per week to skill development as part of a career advancement framework. In some embodiments, allocation datum 134 may include qualitative allocations. As a non-limiting example, allocation datum 134 may include assigning priority levels to specific targets 126. For instance, and without limitation, processor 102 may determine that achieving a "debt repayment" target has a higher priority than a "vacation savings" target, and allocation datum 134 may reflect this prioritization by adjusting the distribution of resources.

With continued reference to FIG. 1, for the purposes of this disclosure, an "allocation machine-learning model" is a machine-learning model that determines an allocation datum. In some embodiments, allocation datum 134 may be dynamically updated by allocation machine-learning model 138 in response to changing conditions: for instance, but not limited to fluctuations in income, unexpected expenses, changes to a user's targets 126, or the like. For example, and without limitation, if a user receives a salary increase, allocation datum 134 may be recalculated to suggest higher monthly contributions toward long-term savings goals. In some embodiments, allocation machine-learning model 138 may generate allocation datum 134 by analyzing patterns, constraints, and trade-offs derived from key data points 124 and targets 126. For example, and without limitation, allocation machine-learning model 138 may predict an optimal distribution of resources based on historical spending data, projected investment returns, and user risk tolerance, and then update framework parameters 130 and/or allocation datum 134 accordingly.

With continued reference to FIG. 1, in some embodiments, processor 102 may be configured to generate allocation training data 140. In a non-limiting example, allocation training data 140 may include correlations between exemplary key data points, exemplary targets, exemplary projection data and/or exemplary allocation data. In some embodiments, allocation training data 140 may be stored in framework database 114. In some embodiments, allocation training data 140 may be received from one or more users, framework database 114, external computing devices, and/ or previous iterations of processing. As a non-limiting example, allocation training data 140 may include instructions from a user, who may be an expert user, a past user in embodiments disclosed herein, or the like, which may be stored in memory and/or stored in framework database 114, where the instructions may include labeling of training examples. In some embodiments, allocation training data 140 may be updated iteratively on a feedback loop. As a non-limiting example, processor 102 may update allocation training data 140 iteratively through a feedback loop as a function of data set 106, key data point 124, target 126, data category 128, projection datum, or the like. In some embodiments, processor 102 may be configured to generate an allocation machine-learning model 138. In a non-limiting example, generating allocation machine-learning model 138 may include training, retraining, or fine-tuning allocation machine-learning model 138 using allocation training data 140 or updated allocation training data 140. In some embodiments, processor 102 may be configured to determine allocation datum 134 using allocation machine-learning model 138 (i.e. trained or updated allocation machine-learning model 138).

With continued reference to FIG. 1, in some embodiments, determining allocation datum 134 may include determining a projection datum as a function of target 126. For the purposes of this disclosure, a "projection datum" is a data element that indicates a projection related to a target. As a non-limiting example, projection datum may include a projection of a capital needed to reach target 126. For example, and without limitation, projection datum may indicate that a user must save $60,000 for a "home purchasing" target. As a non-limiting example, projection datum may include a capital required for each goal (framework parameter 130). For instance, and without limitation, if targets 126 includes saving for retirement or buying a house, projection datum may specify that $50,000 must be needed toward a down payment within five years or that $1,000 per month should be contributed to a retirement savings plan. In some embodiments, processor 102 may determine projection datum as a function of target 126 and updated data. As a non-limiting example, processor 102 may determine projection datum as a function of inflation, market conditions, or changes in income. In some embodiments, processor 102 may determine allocation datum 134 based on projection datum to optimize an achievement of target 126. In some embodiments, projection datum may be stored in framework database 114 and processor 102 may retrieve projection datum from framework database 114. In some embodiments, user may manually input projection datum.

With continued reference to FIG. 1, in some embodiments, processor 102 may be configured to generate projection training data. In a non-limiting example, projection training data may include correlations between exemplary key data points, exemplary targets and exemplary projection data. In some embodiments, projection training data may be stored in framework database 114. In some embodiments, projection training data may be received from one or more users, framework database 114, external computing devices, and/or previous iterations of processing. As a non-limiting example, projection training data may include instructions from a user, who may be an expert user, a past user in embodiments disclosed herein, or the like, which may be stored in memory and/or stored in framework database 114, where the instructions may include labeling of training examples. In some embodiments, projection training data may be updated iteratively on a feedback loop. As a non-limiting example, processor 102 may update projection training data iteratively through a feedback loop as a function of data set 106, key data point 124, target 126, data category 128, or the like. In some embodiments, processor 102 may be configured to generate an projection machine-learning model. In a non-limiting example, generating projection machine-learning model may include training, retraining, or fine-tuning projection machine-learning model using projection training data or updated projection training data. In some embodiments, processor 102 may be configured to determine projection datum using projection machine-learning model (i.e. trained or updated projection machine-learning model).

With continued reference to FIG. 1, in some embodiments, user may be classified to a user cohort 142 using a cohort classifier 144. For the purposes of this disclosure, a "cohort classifier" is a classifier that classifies a user to a user cohort. In some embodiments, cohort classifier 144 may employ various machine-learning techniques. As a non-limiting example, cohort classifier 144 may include supervised learning, unsupervised clustering, hybrid approaches, decision trees, support vector machines, neural networks, or clustering algorithms to identify patterns or similarities among users or data sets 106 and assign them to appropriate user cohorts 142. For the purposes of this disclosure, a "user cohort" is a group or category of users who share common characteristics, behaviors, preferences, or circumstances. In some embodiments, user cohorts 142 may be defined based on demographic, behavioral, financial, or other attributes. As a non-limiting example, user cohort 142 may include demographic-based cohorts. For example, and without limitation, user cohort 142 may include age group or geographic location group. In another non-limiting example, user cohort 142 may include behavior-based cohorts. In some embodiments, user cohort 142 may be goal-specific. Cohort classifier 144 may be consistent with any classifier discussed in this disclosure. Cohort classifier 144 may be trained on cohort training data 146. For the purposes of this disclosure, "cohort training data" is training data that consists of labeled or unlabeled data sets used to train a cohort classifier. As a non-limiting example, cohort training data 146 may include exemplary data sets correlated to exemplary user cohorts. In some embodiments, a user may be classified to a user cohort 142 and processor 102 may generate framework 116 and/or framework parameter 130 based on the user cohort 142 using a machine-learning module as described in detail with respect to FIG. 3 and the resulting output may be used to update training data of framework machine-learning module 132 or any machine-learning models within framework machine-learning module 132. In some embodiments, generating training data and training machine-learning models may be simultaneous.

With continued reference to FIG. 1, in some embodiments, framework machine-learning module 132 may be customized for a specific user. As a non-limiting example, framework machine-learning module 132 may learn from actual data (data set 106) or behavior (behavior data) of a user to better devise frameworks 116 for the user overtime. In a non-limiting example, framework machine-learning module 132 may be private to a user as the framework machine-learning module 132 has been exposed to user's private financial data. In a non-limiting example, framework machine-learning module 132 may be (and other data processing for a user) may be done in a secure enclave in order to sequester data set 116 and a plurality of allocation machine-learning models 138 that have been trained on data set 106. For example, and without limitation, a virtual machine may be utilized to ensure that computations involving sensitive financial data (e.g., data set 106) remain isolated from external access. In some embodiments, framework machine-learning module 132 may be customized for a specific user based on personalized financial behavior, historical transaction patterns, user's spending habits, risk tolerance, or unique financial goals. In some embodiments, determining allocation datum 134 may include selecting an allocation machine-learning model 138 from a plurality of allocation machine-learning models 138 as a function of one or more user cohorts 142 and the allocation machine-learning model 138 may be trained on cohort-specific training data. For the purposes of this disclosure, "cohort-specific training data" is a set of allocation training data that is specific to a specific cohort of a user. As a non-limiting example, cohort-specific training data may include aggregated financial behavior, spending patterns, investment strategies, and goal achievement rates of users within a defined user cohort 142. For example, and without limitation, user cohort 142 related to a particular age group, income bracket, financial objective category, or the like. In a non-limiting example, if a user belongs to a user cohort 142 of mid-career professionals saving for retirement, an allocation machine-learning model 138 may be selected for the user cohort 142 may the selected allocation machine-learning model 138 may be trained on data (cohort-specific training data) reflecting common contribution rates, risk tolerances, and asset allocation strategies within that demographic.

With continued reference to FIG. 1, in some embodiments, framework machine-learning module 132 may include a large language model (LLM) 148 configured to analyze context of data set 106. A "large language model," as used herein, is a deep learning algorithm that can recognize, summarize, translate, predict and/or generate text and other content based on knowledge gained from massive datasets. LLM 148 may be a type of generative artificial intelligence (AI). LLM 148 may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLM 148, in some embodiments, may include GPT, GPT-2, GPT-3, and other language processing models. LLM 148 may be used to augment the text in an article based on a prompt. Training data may correlate elements of a dictionary related to linguistics, as described above, to a prompt. LLM 148 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 148 may output such predictions by ranking words by likelihood or a prompt parameter. For the example given above, the LLM 148 may score "you" as the most likely, "your" as the next most likely, "his" or "her" next, and the like.

Still referring to FIG. 1, LLM 148 may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM 148 may predict the next word by searching for a set of position in a source sentence where the most relevant information is concentrated. LLM 148 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM 148 may include encoder-decoder model incorporating an attention mechanism.

Still referring to FIG. 1, LLM 148 may include a transformer architecture. In some embodiments, encoder component of LLM 148 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 148 may predict the next word by searching for a set of position in a source sentence where the most relevant information is concentrated. LLM 148 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 148, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 148 may pick up particular parts at different positions in the input sequence and over time compute an initial composition of the output sequence. In multi-head attention, LLM 148 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 148 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 148 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 148 may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM 148 may learn to associate the word "you", with "how" and "are". It's also possible that LLM 148 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM 148 to learn to extract and focus on different combinations of attention from its attention heads.

With continued reference to FIG. 1, in some embodiments, LLM 148 may be specifically trained using large language model (LLM 148) training data. In some embodiments, LLM training data may include correlations between exemplary data sets and exemplary contexts. In some embodiments, LLM training data may include a set of data that is in user's voice, email, or the like to mimic them. In some embodiments, LLM training data may be consistent with any training data described in the entirety of this disclosure. In some embodiments, LLM training data may be received from one or more users, framework database 114, external computing devices, and/or previous iterations of processing. As a non-limiting example, LLM training data may include instructions from a user, who may be an expert user, a past user in embodiments disclosed herein, or the like, which may be stored in memory and/or stored in framework database 114, where the instructions may include labeling of training examples. In some embodiments, LLM training data may be updated iteratively through a feedback loop. As a non-limiting example, LLM training data may be updated iteratively through a feedback loop as a function of newly collected data set 106, key data points 124, output of machine-learning models described herein, or the like. In some embodiments, processor 102 may be configured to generate LLM 148. In a non-limiting example, generating LLM 148 may include training, retraining, or fine-tuning LLM 148 using LLM training data or updated LLM training data. In some embodiments, processor 102 may be configured to generate framework 116 using LLM 148 (i.e. trained or updated LLM 148).

With continued reference to FIG. 1, in some embodiments, processor 102 may utilize similarity-based fetching techniques to identify most relevant data for input to LLM 148. For the purposes of this disclosure, "similarity-based fetching" is a process by which a query is converted into a high-dimensional vector embedding, representing its semantic meaning, and compared with pre-computed embeddings of documents or data in a database. In some embodiments, retrieved documents with high similarity scores may be integrated into an input for LLM 148. In some embodiments, processor 102 may select an appropriate database for a given query based on context and sensitivity of information. In some embodiments, LLM 148 may generate an initial response based on an input query, and this response may be then analyzed to identify additional relevant keywords or concepts. In some embodiments, these elements may subsequently be used to perform a second round of data retrieval. In a non-limiting example, additional retrieved data may then be input into LLM 148 alongside the original query and first response to generate an output.

With continued reference to FIG. 1, in some embodiments, processor 102 may generate hypothetical document embeddings. For the purposes of this disclosure, a "hypothetical document embedding" refers to an embedding created by LLM 148 that represents its semantic understanding of a query or preliminary response. In some embodiments, the embeddings may be compared against database embeddings to identify documents or data closely aligned with the system's understanding of a query. In some embodiments, the retrieved information may then be incorporated into an input of LLM 148.

With continued reference to FIG. 1, memory 104 contains instructions configuring processor 102 to generate a dynamic user interface 150 including framework 116. For the purposes of this disclosure, a "dynamic user interface" is a user interface that adapts in real-time to user interactions, or changes in a data set. In some embodiments, dynamic user interface 150 may be designed to provide a personalized and responsive experience by updating its content, layout, or functionality based on user input 110, framework 116, framework parameters 130, allocation datum 134, projection datum, and the like. As a non-limiting example, dynamic user interface 150 may update to display new framework parameters 130 when a user modifies their targets 126. For instance, and without limitation, if a user adjusts their retirement savings goal, dynamic user interface 150 may display updated savings milestones (framework parameter 130) or allocation datum 134. In another non-limiting example, dynamic user interface 150 may include a visual element that dynamically adjust based on user actions or system recommendations. For example, and without limitation, a graph showing projected savings over time may update when a user adjusts their monthly contribution. In some embodiments, dynamic user interface 150 may include contextual prompts or notifications. For example, if processor 102 detects that a user has not met a milestone (framework parameter 130) within their framework 116, dynamic user interface 150 may display a reminder (alert 152) or suggest corrective actions 154. In some embodiments, processor 102 may generate a prompt related to framework 116 for a user, display the prompt to the user and update or modify framework 116 based on a user input 110 for the prompt. As a non-limiting example, processor 102 may generate a prompt asking a user if the user wants to modify any elements (e.g., target 126, framework parameter 130, allocation datum 134, temporal element 136, or the like) displayed within framework 116. For example, and without limitation, prompt may indicate if a user wants to lower or change their goals. For example, and without limitation, prompt may indicate if a user wants to pursue aggressive strategy. In some embodiments, processor 102 may automatically update framework 116 as the processor 102.

With continued reference to FIG. 1, for the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, processor 102 may generate dynamic user interface 150 including an event handler. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input 110, such as, but not limited to, mouse clicks, mouse hovering, touchscreen input, keystrokes, and the like. For instance and without limitation, an event handler may be programmed to generate a pop-up window if a user double clicks on a specific icon. User input 110 may include a manipulation of computer icons, such as, but not limited to, clicking, selecting, dragging and dropping, scrolling, and the like. In some embodiments, user input 110 may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI.

With continued reference to FIG. 1, in some embodiments, generating framework 116 may include generating a status datum 156 associated with each of a plurality of targets 126 as a function of allocation datum 134 and key data points 124. For the purposes of this disclosure, a "status datum" is a data element that indicates a data element that indicates a current state, progress, or condition of a data set based on a target. In some embodiments, status datum 156 may represent how close a user is to achieving a specific goal or whether adjustments are needed. As a non-limiting example, status datum 156 may indicate a user's progress toward a specific goal. For instance, and without limitation, if a user's target 126 is to save $50,000 for a home down payment and their current savings (key data point 124) is $25,000, status datum 156 may indicate that the user has achieved 50% of their goal. In another non-limiting example, status datum 156 may provide a real-time assessment of a user's adherence to a plan. For example, and without limitation, if a user's monthly savings target (projection datum or allocation datum 134) is $1,000 but their actual contributions over the past three months average $800, status datum 156 may indicate an underperformance trend and suggest corrective actions 154. The corrective action 154 described herein is further described below. In some embodiments, status datum 156 may reflect goal completion milestones. For instance, and without limitation, status datum 156 may indicate that a user is "on track," "ahead of schedule," or "behind schedule" based on a comparison of their progress against predefined benchmarks or timelines (e.g., projection datum or allocation datum 134). In some embodiments, status datum 156 may include predictive elements. For example, and without limitation, processor 102 may generate a status datum 156 indicating that a user is projected to meet their retirement savings target 126 within a desired timeline if they maintain their current savings rate (projection datum or allocation datum 134) and investment performance. In some embodiments, status datum 156 may be stored in framework database 114. In some embodiments, user may manually input status datum 156.

With continued reference to FIG. 1, in some embodiments, generating dynamic user interface 150 may include generating an alert 152 as a function of status datum 156 and a plurality of targets 126. For the purposes of this disclosure, an "alert" is a message, notification, or prompt for informing a user of any information related to targets and key data points. In some embodiments, status datum 156 may be used to generate alert 152 within a dynamic user interface 150. For example, and without limitation, if status datum 156 indicates that a user is falling short of their monthly savings target, processor 102 may prompt the user to adjust their budget or recommend increasing their savings rate to stay on track. As a non-limiting example, alert 152 may include notifications related to milestone achievements. For instance, and without limitation, if status datum 156 indicates that a user has saved 50% of their goal for a down payment on a house, processor 102 may generate an alert 152 to congratulate the user and encourage continued progress. In another non-limiting example, alert 152 may include reminders or warnings. For example, and without limitation, if status datum 156 indicates that a user is falling short of their monthly savings target, processor 102 may generate an alert 152 to notify the user of the shortfall and recommend actions (corrective action 154). In some embodiments, alert 152 may include time-sensitive notifications. For example, and without limitation, if a user has set a goal to contribute to their retirement account by a specific date and has not yet completed the contribution, processor 102 may generate an alert 152 to remind the user to take action. In some embodiments, alert 152 may include dynamic visual or auditory cues within dynamic user interface 150. For instance, and without limitation, alert 152 may include a pop-up notification, a highlighted graph segment, or a progress bar update. In some embodiments, alerts 152 may be customized based on user preferences. As a non-limiting example, user preference may include frequency, format, delivery method, and the like. For example, and without limitation, a user may choose to receive alerts 152 through push notifications on a user device 112, email updates, or in-app messages within dynamic user interface 150.

With continued reference to FIG. 1, in some embodiments, generating framework 116 may include determining a behavioral pattern of the data set 106 as a function of behavioral data of the data set 106 and a pattern machine-learning model and generating a corrective action 154 as a function of the behavioral pattern of data set 106 and status datum 156. For the purposes of this disclosure, a "corrective action" is an action, recommendation, or adjustment suggested or implemented by a processor to address deviations, inefficiencies, or challenges between a framework and key data points based on a status datum. In some embodiments, corrective action 154 may be designed to optimize a user's progress by modifying resource allocations (allocation datum 134), user behaviors, or framework parameters 130. As a non-limiting example, corrective action 154 may include suggesting reallocating resources from other funds to meet a target 126. For instance, and without limitation, if the status datum 156 indicates that a user's retirement fund is underfunded, corrective action 154 may recommend reducing discretionary spending or reallocating surplus funds from a vacation savings account to the retirement fund. In another non-limiting example, corrective action 154 may suggest personalized adjustments to optimize a likelihood of achieving financial independence. For instance, and without limitation, if processor 102 identifies a behavior pattern in a data set 106 indicating that a user consistently exceeds their monthly spending limits, corrective action 154 may recommend setting stricter spending caps, automating savings transfers, or creating more detailed expense categories to improve budgeting. In some embodiments, corrective action 154 may include suggestions for behavioral adjustments. For example, and without limitation, if processor 102 identifies that a user has delayed contributing to a savings goal, corrective action 154 may include prompting the user to set up automatic deposits or providing educational resources. In some embodiments, corrective action 154 may incorporate predictive analytics to anticipate potential shortfalls or opportunities. For example, and without limitation, if processor 102 detects a trend in market performance suggesting an unfavorable return on a specific investment, corrective action 154 may recommend reallocating investment funds to a lower-risk portfolio or adjusting the investment timeline to minimize losses. In another non-limiting example, corrective action 154 may address time-sensitive situations. For instance, and without limitation, if processor 102 determines that a user is approaching a target deadline without sufficient progress, corrective action 154 may suggest increasing the frequency or amount of contributions, extending the timeline, or reprioritizing other targets 126. For behavioral adjustment, corrective action 154 may include tailored interventions designed to help users form better financial habits. For instance, and without limitation, if a user's data set 106 indicates impulsive spending patterns (behavior pattern), processor 102 may suggest enabling real-time spending alerts or introducing a delay before purchases are finalized to encourage thoughtful decision-making. In some embodiments, corrective action 154 may include simulations or "what-if" scenarios. For example, and without limitation, processor 102 may allow a user to explore an impact of different corrective actions 154 (e.g., increasing savings, adjusting targets, and the like) on their framework 116.

With continued reference to FIG. 1, for the purposes of this disclosure, a "behavioral pattern" is a recurring or recognizable trend in behavior data over time. In some embodiments, behavioral pattern may represent consistent actions, tendencies, or decision-making habits related to spending, saving, investing, budgeting, debt management, or financial goal-setting. As a non-limiting example, behavioral pattern may include a user's habit of spending a higher percentage of their income on discretionary expenses at the end of each month. As another non-limiting example, behavioral pattern may include a user's approach to savings contributions, investment strategies, recurring late bill payments, and the like. In some embodiments, behavioral pattern may be stored in framework database 114 and processor 102 may retrieve behavioral pattern from framework database 114. In some embodiments, user may manually input behavioral pattern.

With continued reference to FIG. 1, in some embodiments, processor 102 may be configured to generate pattern training data. In a non-limiting example, pattern training data may include correlations between exemplary behavioral data and exemplary behavior patterns. In some embodiments, pattern training data may be stored in framework database 114. In some embodiments, pattern training data may be received from one or more users, framework database 114, external computing devices, and/or previous iterations of processing. As a non-limiting example, pattern training data may include instructions from a user, who may be an expert user, a past user in embodiments disclosed herein, or the like, which may be stored in memory and/or stored in framework database 114, where the instructions may include labeling of training examples. In some embodiments, pattern training data may be updated iteratively on a feedback loop. As a non-limiting example, processor 102 may update pattern training data iteratively through a feedback loop as a function of data set 106, key data point 124, target 126, data category 128, projection datum, or the like. In some embodiments, processor 102 may be configured to generate an pattern machine-learning model. In a non-limiting example, generating pattern machine-learning model may include training, retraining, or fine-tuning pattern machine-learning model using pattern training data or updated pattern training data. In some embodiments, processor 102 may be configured to determine behavior pattern using pattern machine-learning model (i.e. trained or updated pattern machine-learning model).

With continued reference to FIG. 1, in some embodiments, generating framework 116 may include updating a plurality of targets 126 as a function of corrective action 154.

In some embodiments, updating targets 126 may include modifying, refining, or reprioritizing targets 126 to ensure alignment with corrective actions 154, status datum 156, and key data points 124. As a non-limiting example, if corrective action 154 suggests reallocating resources from one target 126 to another target 126, processor 102 may update the affected targets 126 by adjusting associated framework parameters 130. In another non-limiting example, if corrective action 154 identifies that a user's retirement savings target 126 is overly ambitious based on their current income and spending patterns, processor 102 may update the target 126 by recommending a more realistic retirement age or a revised monthly contribution amount. In some embodiments, updating targets 126 may include reprioritizing goals. For instance, and without limitation, if corrective action 154 identifies an unforeseen financial obligation, processor 102 may adjust the user's targets 126 by temporarily deprioritizing discretionary goals (e.g., vacation savings) in favor of addressing the immediate need. In another non-limiting example, if corrective action 154 suggests optimizing investment strategies for a user's financial portfolio, processor 102 may update targets 126 related to investment growth by adjusting risk tolerance parameters or reallocating asset classes to align with the updated strategy. In some embodiments, updates to targets 126 may reflect user-initiated changes influenced by corrective actions 154. For example, and without limitation, if a user agrees to a recommendation to automate monthly savings, processor 102 may update targets 126 to reflect a more consistent and predictable savings trajectory.

Figure 2:
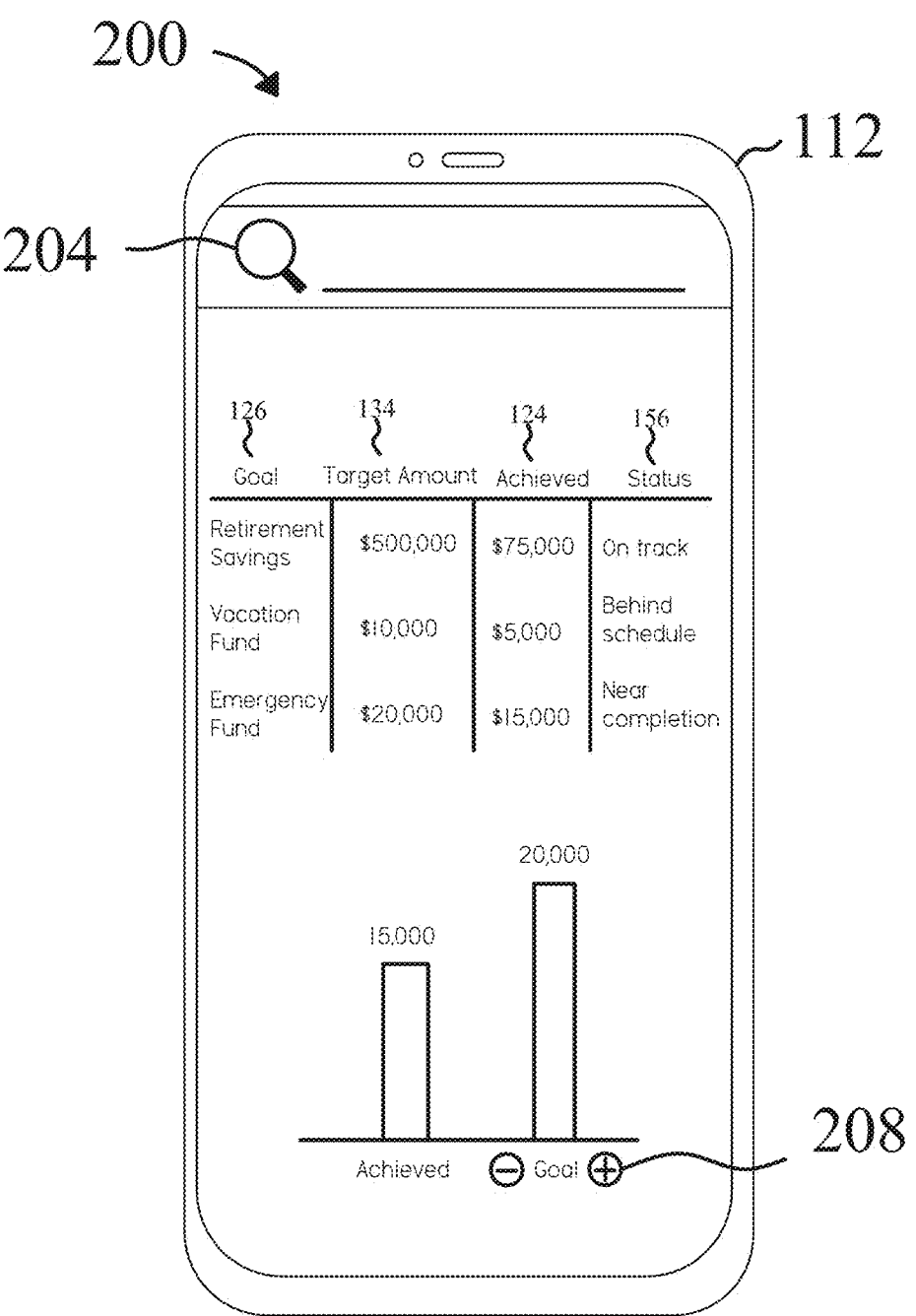
FIG. 2 illustrates an exemplary dynamic user interface on a user device.

Referring now to FIG. 2, an exemplary dynamic user interface 200 on a user device 112 is illustrated. In a non-limiting example, dynamic user interface 200 may include data set 106, key data points 124, status datum 156, interactive data structure 118, user input 110, targets 126, data categories 128, framework 116, allocation datum 134, projection datum, temporal element 136, corrective action 154, and the like. In some embodiments, dynamic user interface 200 may include a user input field 204. As a non-limiting example, user input field 204 may include, but is not limited to, text boxes numerical fields, search fields, filtering fields, and the like. For example, if a user modifies a financial goal within user input field 204, dynamic user interface 200 may immediately recalculate and update framework 116, allocation datum 134, and projection datum to reflect the change. In some embodiments, dynamic user interface 200 may be configured to update in real time based on user interactions. For the purposes of this disclosure, a "graphic element" is a visual component within a dynamic user interface. In some embodiments, dynamic user interface 200 may include a graphic element 208. As a non-limiting example, graphic element 208 may include charts, graphs, icons, buttons, progress bars, visual indicators, animations, or the like. In a non-limiting example, as shown in FIG. 2, graphic element 208 may allow a user to interact so that the user can adjust a level of goal (e.g., target 126) and dynamically modify a graph according to the user interaction. In another non-limiting example, dynamic user interface 200 may present interactive visualizations that respond to user input 110 or user interaction with graphic elements: for instance updating graphical progress bars or charts to reflect real-time changes in financial projections (projection datum). In some embodiments, dynamic user interface 200 may incorporate contextual prompts and alerts 152 that adjust based on evolving user behaviors. For instance, and without limitation, if processor 102 detects a recurring pattern of underfunding a goal, dynamic user interface 200 may highlight a corrective action 154 or provide alternative scenarios for achieving target 126 within a modified temporal element 136.

Figure 3:
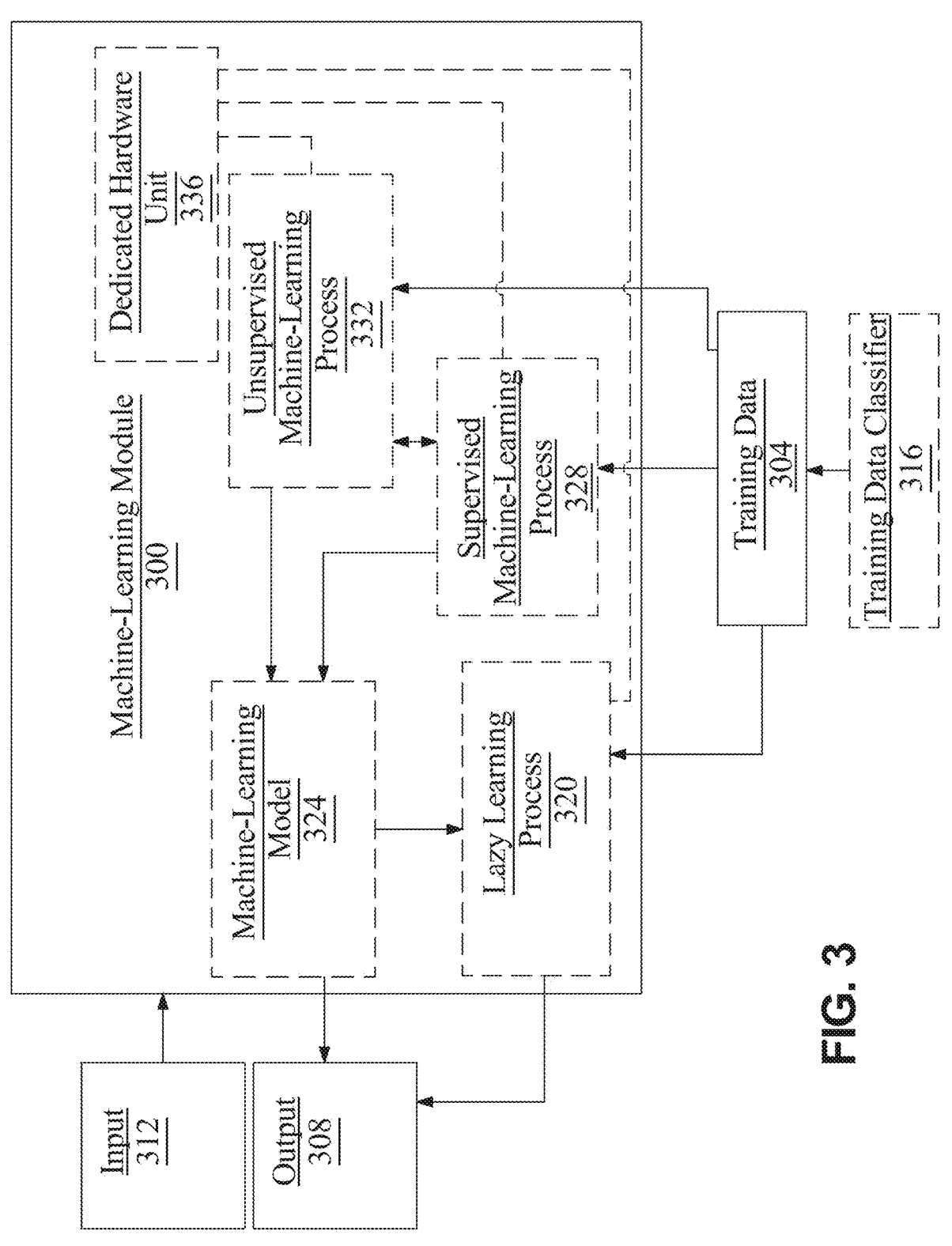
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include data set 106, key data points 124, interactive data structure 118, user input 110, targets 126, data categories 128, allocation datum 134, projection datum, temporal element 136, corrective action 154, and the like. As a non-limiting illustrative example, output data may include data set 106, key data points 124, interactive data structure 118, user input 110, targets 126, framework 116, data categories 128, allocation datum 134, projection datum, temporal element 136, corrective action 154, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohort related to user's demographic, location, preference, pattern, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:\ X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which then generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include data set 106, key data points 124, interactive data structure 118, user input 110, targets 126, data categories 128, allocation datum 134, projection datum, temporal element 136, corrective action 154, and the like as described above as inputs, data set 106, key data points 124, interactive data structure 118, user input 110, targets 126, framework 116, data categories 128, allocation datum 134, projection datum, temporal element 136, corrective action 154, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
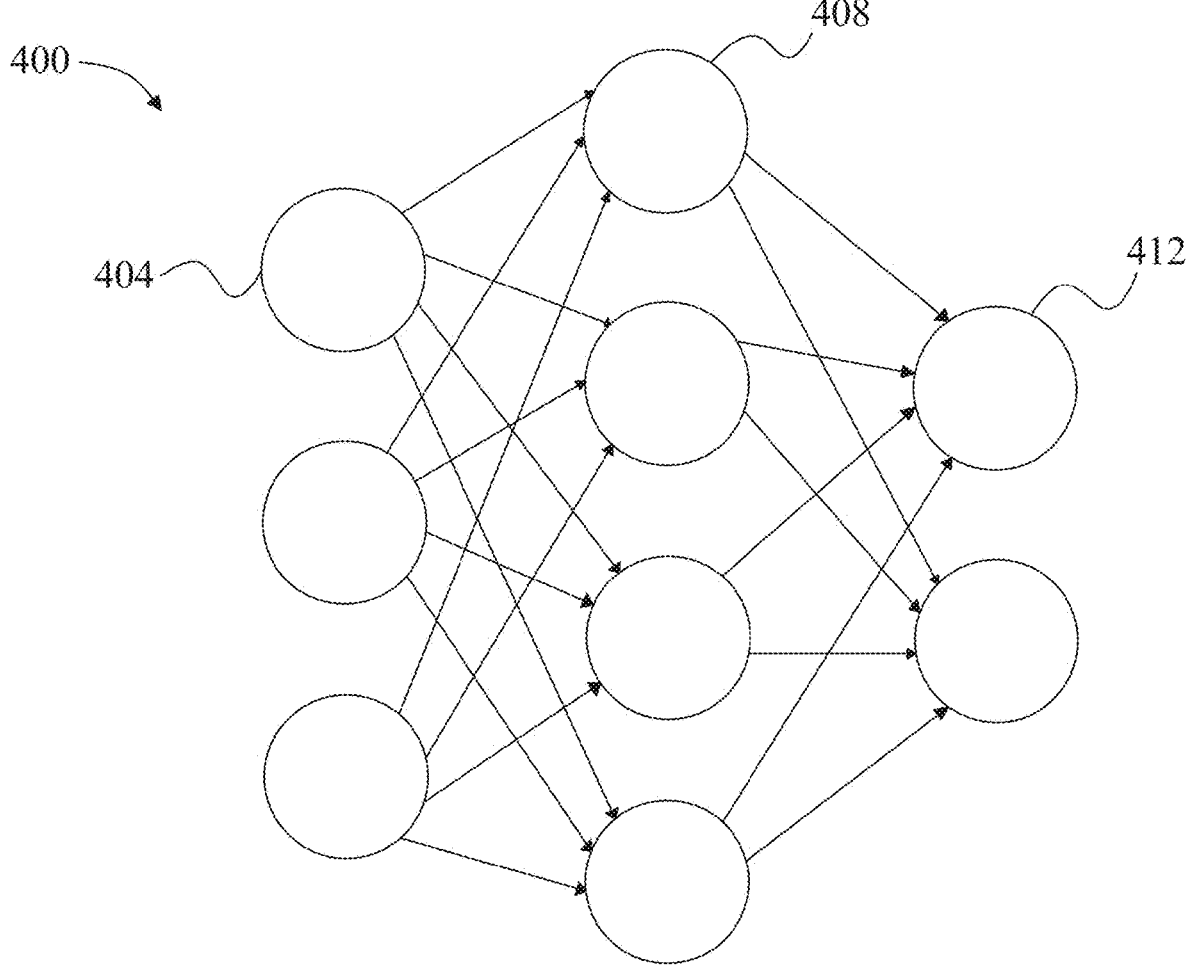
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
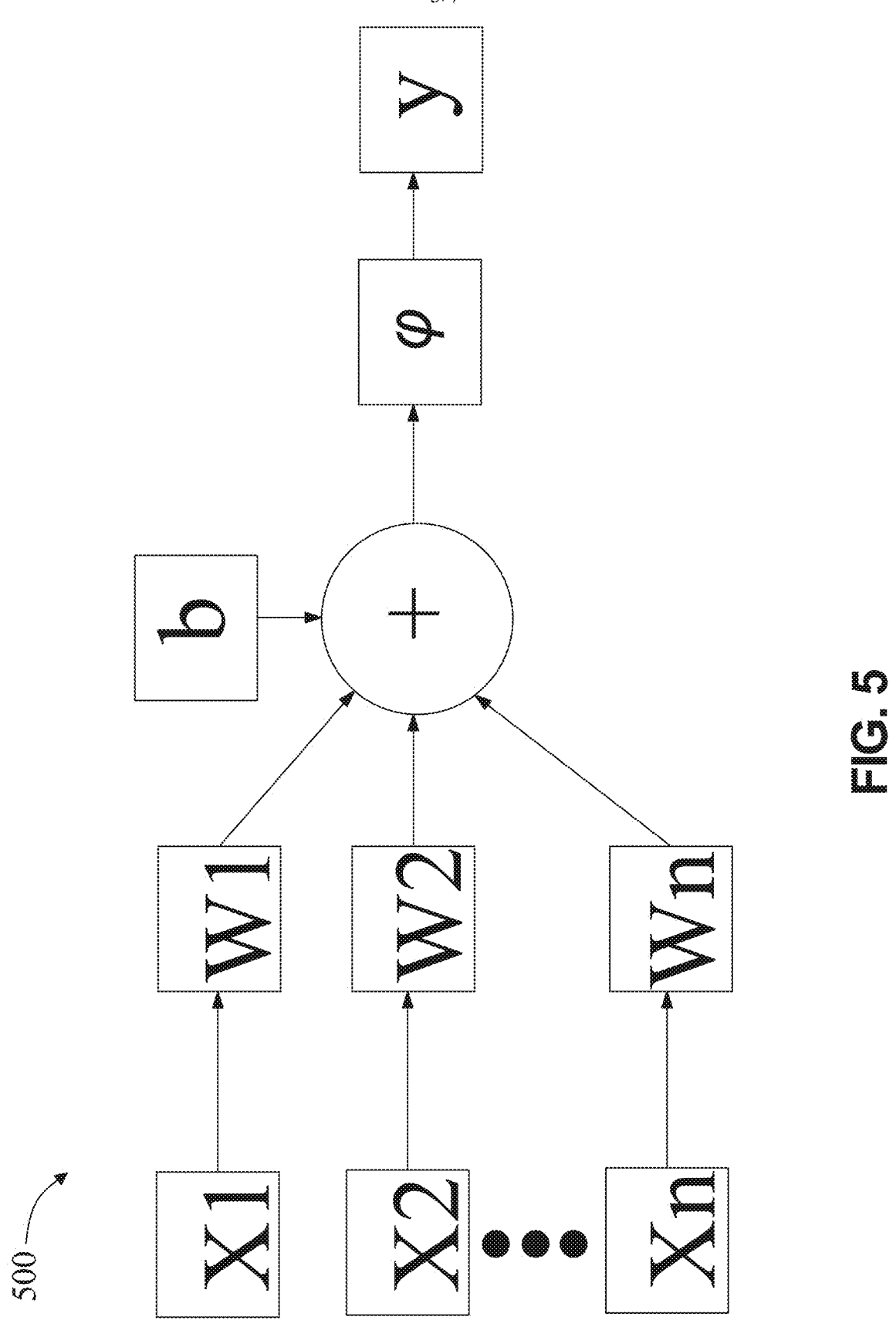
FIG. 5 illustrates a block diagram of an exemplary node in a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}} \text{ given input } x,$$

a tanh (hyperbolic tangent) function, of the form $$\frac{e^x - e^{-x}}{e^x + e^{-x}},$$

a tanh derivative function such as $$f(x) = \tanh^2(x),$$

a rectified linear unit function such as $$f(x) = \max(0, x),$$

a "leaky" and/or "parametric" rectified linear unit function such as $$f(x) = \max(ax, x)$$

for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as function such as $$f(x) = x * \text{sigmoid}(x),$$

a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function, $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
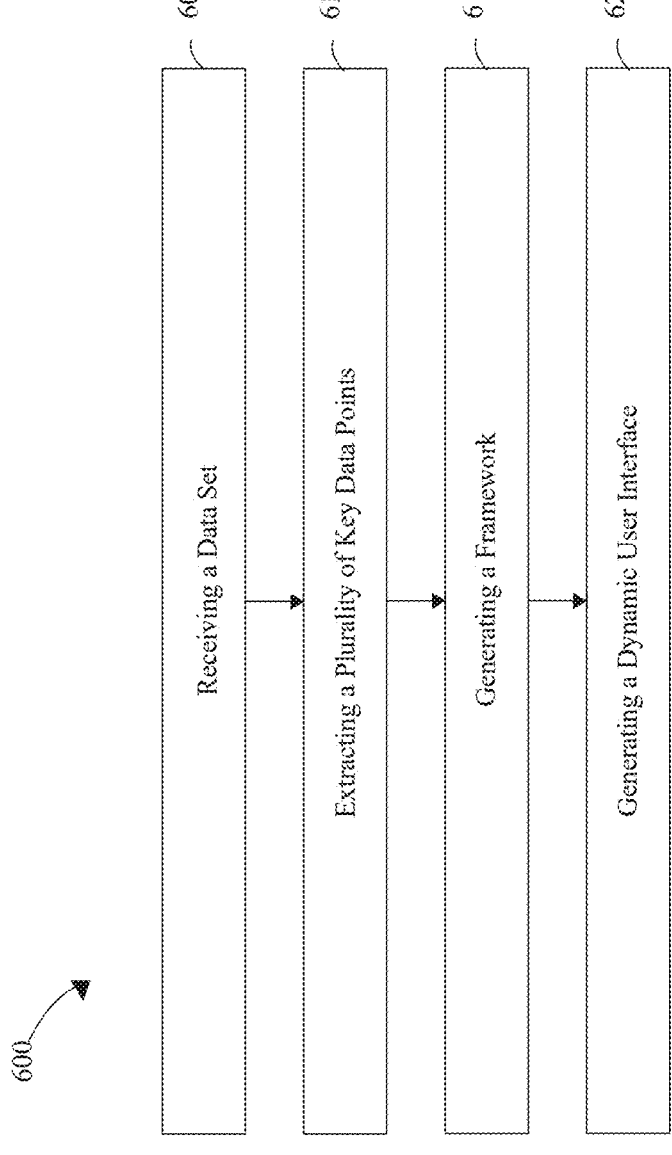
FIG. 6 illustrates a flow diagram of an exemplary method for generating a framework.

Referring now to FIG. 6, a flow diagram of an exemplary method 600 for generating a framework is illustrated. Method 600 contains a step 605 of receiving, using at least a processor, a data set associated with a user from data sources, wherein receiving the data set includes receiving the data set from an interactive data structure, wherein the interactive data structure is configured to be updated as a function of a user input. In some embodiments, receiving the data set may include receiving audio data of the user input from the user and extracting the data set from the audio data. These may be implemented as referenced to FIGS. 1-5.

With continued reference to FIG. 6, method 600 contains a step 610 of extracting, using at least a processor, a plurality of key data points and a plurality of targets from a data set as a function of one or more data categories. In some embodiments, extracting the plurality key data points and the plurality of targets may include extracting the plurality of key data points and the plurality of targets using an optical character recognition. These may be implemented as referenced to FIGS. 1-5.

With continued reference to FIG. 6, method 600 contains a step 615 of generating, using at least a processor, a framework including a plurality of framework parameters as a function of a plurality of key data points and a plurality of targets using a framework machine-learning module, wherein generating the framework includes determining an allocation datum for each of the plurality of targets using an allocation machine-learning model of the framework machine-learning module and updating the plurality of framework parameters as a function of the allocation datum. In some embodiments, generating the framework may include generating a status datum associated with each of the plurality of targets as a function of the allocation datum and the plurality of key data points. In some embodiments, generating the dynamic user interface may include generating an alert as a function of the status datum and the plurality of targets. In some embodiments, generating the framework may include determining a behavioral pattern of the data set as a function of behavioral data of the data set and a pattern machine-learning model and generating a corrective action as a function of the behavioral pattern and the status datum. In some embodiments, generating the framework may include updating the plurality of targets as a function of the corrective action. In some embodiments, generating the framework may include generating cohort training data, wherein the cohort training data may include exemplary data sets correlated to exemplary user cohorts, training a cohort classifier using the cohort training data, classifying the data set into one or more user cohorts using the trained cohort classifier and generating the framework as a function of the one or more user cohorts. In some embodiments, determining the allocation datum may include selecting the allocation machine-learning model from a plurality of allocation machine-learning models as a function of the one or more user cohorts, wherein the allocation machine-learning model is trained on cohort-specific training data. In some embodiments, generating the framework may include determining a temporal element for each of the plurality of targets and the allocation datum and updating the plurality of framework parameters to comprise the temporal element. These may be implemented as referenced to FIGS. 1-5.

With continued reference to FIG. 6, method 600 contains a step 620 of generating, using at least a processor, a dynamic user interface including a framework. This may be implemented as referenced to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
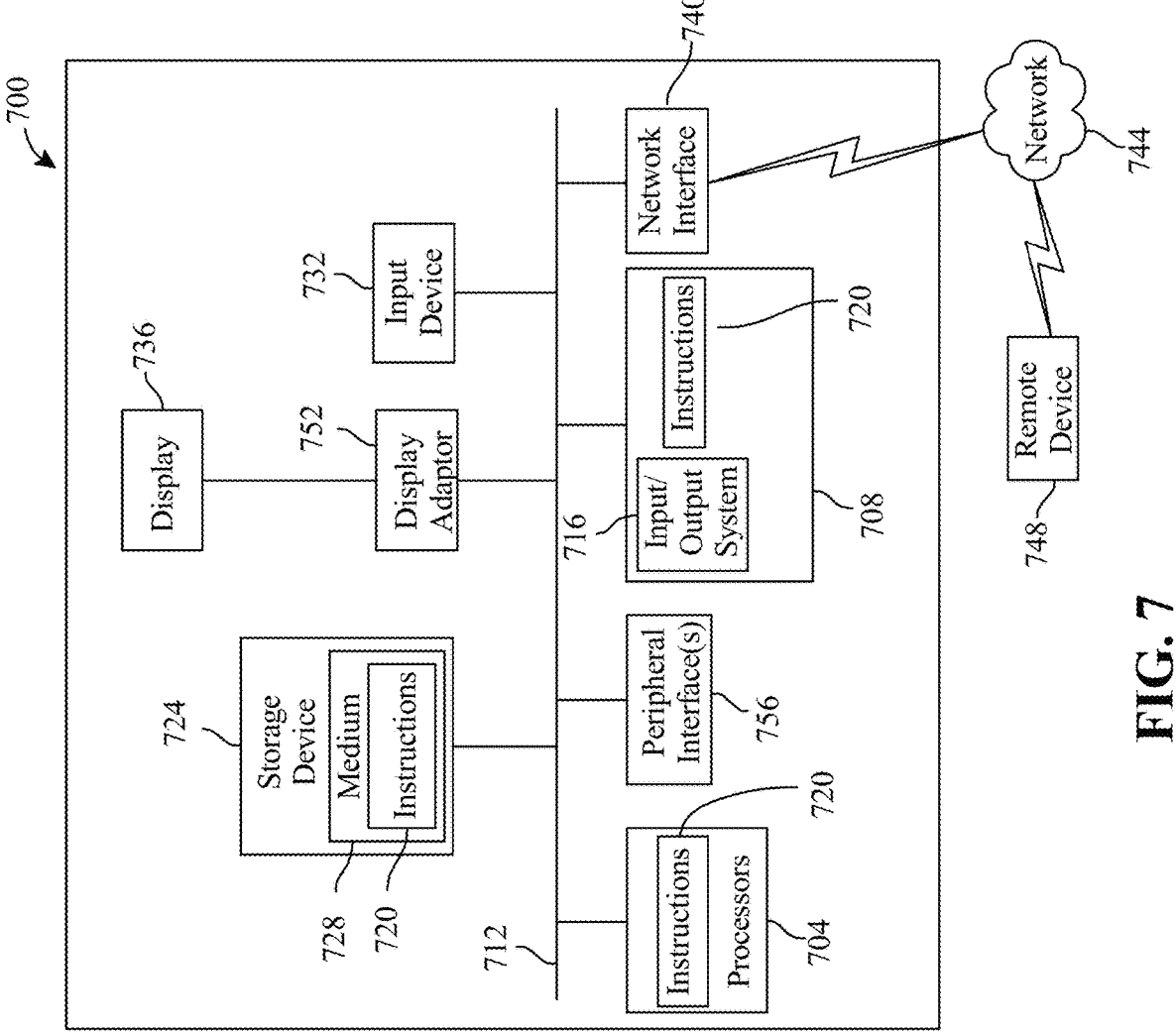
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and memory 708 that communicate with each other, and with other components, via a bus 712. Bus 712 may include any of several types of bus structures including, but not limited to, memory bus, memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a framework, the apparatus comprising:

at least a processor; and a memory communicatively connected to the at least a processor, wherein the memory contains instructions configuring the at least a processor to:

receive a data set associated with a user from data sources, wherein receiving the data set comprises receiving the data set from an interactive data structure, wherein the interactive data structure is configured to be updated as a function of a user input;

extract a plurality of key data points and a plurality of targets from the data set as a function of one or more data categories;

generate a framework comprising a plurality of framework parameters as a function of the plurality of key data points and the plurality of targets using a framework machine-learning module, wherein generating the framework comprises:

determining an allocation datum for each of the plurality of targets using an allocation machine-learning model of the framework machine-learning module, wherein determining the allocation datum for each of the plurality of targets comprises:

determining a projection datum indicating at least a projected resource requirement associated with a target of the plurality of targets;

identifying one or more allocation constraints applicable across the plurality of targets as a function of the plurality of key data points;

computing, as a function of the projection datum of each of the plurality of targets and the one or more allocation restraints, a quantitative distribution of available resources across the plurality of targets; and generating the allocation datum as a machine-generated data structure representing the quantitative distribution of resources across the plurality of targets; and updating the plurality of framework parameters as a function of the allocation datum for each of the plurality of targets; and generate a dynamic user interface comprising the framework.

2. The apparatus of claim 1, wherein extracting the plurality key data points and the plurality of targets comprises extracting the plurality key data points and the plurality of targets using an optical character recognition.

3. The apparatus of claim 1, wherein receiving the data set comprises:

receiving audio data of the user input from the user; and extracting the data set from the audio data using automatic speech recognition.

4. The apparatus of claim 1, wherein generating the framework comprises generating a status datum associated with each of the plurality of targets as a function of the allocation datum and the plurality of key data points.

5. The apparatus of claim 4, wherein generating the dynamic user interface comprises generating an alert as a function of the status datum and the plurality of targets.

6. The apparatus of claim 4, wherein generating the framework comprises:

determining a behavioral pattern of the data set as a function of behavioral data of the data set and a pattern machine-learning model; and generating a corrective action as a function of the behavioral pattern and the status datum.

7. The apparatus of claim 6, wherein generating the framework comprises updating the plurality of targets as a function of the corrective action.

8. The apparatus of claim 1, wherein generating the framework comprises:

generating cohort training data, wherein the cohort training data comprises exemplary data sets correlated to exemplary user cohorts;

training a cohort classifier using the cohort training data;

classifying the data set into one or more user cohorts using the trained cohort classifier; and generating the framework as a function of the one or more user cohorts.

9. The apparatus of claim 8, wherein determining the allocation datum comprises selecting the allocation machine-learning model from a plurality of allocation machine-learning models as a function of the one or more user cohorts, wherein the allocation machine-learning model is trained on cohort-specific training data.

10. The apparatus of claim 1, wherein generating the framework comprises:

determining a temporal element for each of the plurality of targets and the allocation datum; and updating the plurality of framework parameters to comprise the temporal element.

11. A method for generating a framework, the method comprising:

receiving, using at least a processor, a data set associated with a user from data sources, wherein receiving the data set comprises receiving the data set from an interactive data structure, wherein the interactive data structure is configured to be updated as a function of a user input;

extracting, using the at least a processor, a plurality of key data points and a plurality of targets from the data set as a function of one or more data categories;

generating, using the at least a processor, a framework comprising a plurality of framework parameters as a function of the plurality of key data points and the plurality of targets using a framework machine-learning module, wherein generating the framework comprises:

determining an allocation datum for each of the plurality of targets using an allocation machine-learning model of the framework machine-learning module, wherein determining the allocation datum for each of the plurality of targets comprises:

determining a projection datum indicating at least a projected resource requirement associated with a target of the plurality of targets;

identifying one or more allocation constraints applicable across the plurality of targets as a function of the plurality of key data points;

computing, as a function of the projection datum of each of the plurality of targets and the one or more allocation restraints, a quantitative distribution of available resources across the plurality of targets; and generating the allocation datum as a machine-generated data structure representing the quantitative distribution of resources across the plurality of targets; and updating the plurality of framework parameters as a function of the allocation datum for each of the plurality of targets; and generating, using the at least a processor, a dynamic user interface comprising the framework.

12. The method of claim 11, wherein extracting the plurality key data points and the plurality of targets comprises extracting the plurality of key data points and the plurality of targets using an optical character recognition.

13. The method of claim 11, wherein receiving the data set comprises:

receiving audio data of the user input from the user; and extracting the data set from the audio data using automatic speech recognition.

14. The method of claim 11, wherein generating the framework comprises generating a status datum associated with each of the plurality of targets as a function of the allocation datum and the plurality of key data points.

15. The method of claim 14, wherein generating the dynamic user interface comprises generating an alert as a function of the status datum and the plurality of targets.

16. The method of claim 14, wherein generating the framework comprises:

determining a behavioral pattern of the data set as a function of behavioral data of the data set and a pattern machine-learning model; and generating a corrective action as a function of the behavioral pattern and the status datum.

17. The method of claim 16, wherein generating the framework comprises updating the plurality of targets as a function of the corrective action.

18. The method of claim 11, wherein generating the framework comprises:

generating cohort training data, wherein the cohort training data comprises exemplary data sets correlated to exemplary user cohorts;

training a cohort classifier using the cohort training data;

classifying the data set into one or more user cohorts using the trained cohort classifier; and generating the framework as a function of the one or more user cohorts.

19. The method of claim 18, wherein determining the allocation datum comprises selecting the allocation machine-learning model from a plurality of allocation machine-learning models as a function of the one or more user cohorts, wherein the allocation machine-learning model is trained on cohort-specific training data.

20. The method of claim 11, wherein generating the framework comprises:

determining a temporal element for each of the plurality of targets and the allocation datum; and updating the plurality of framework parameters to comprise the temporal element.

\*    \*    \*    \*    \*